Oct. 31, 1944.  C. W. GORDON  2,361,681
PULVERIZED FUEL BURNER
Filed July 12, 1941
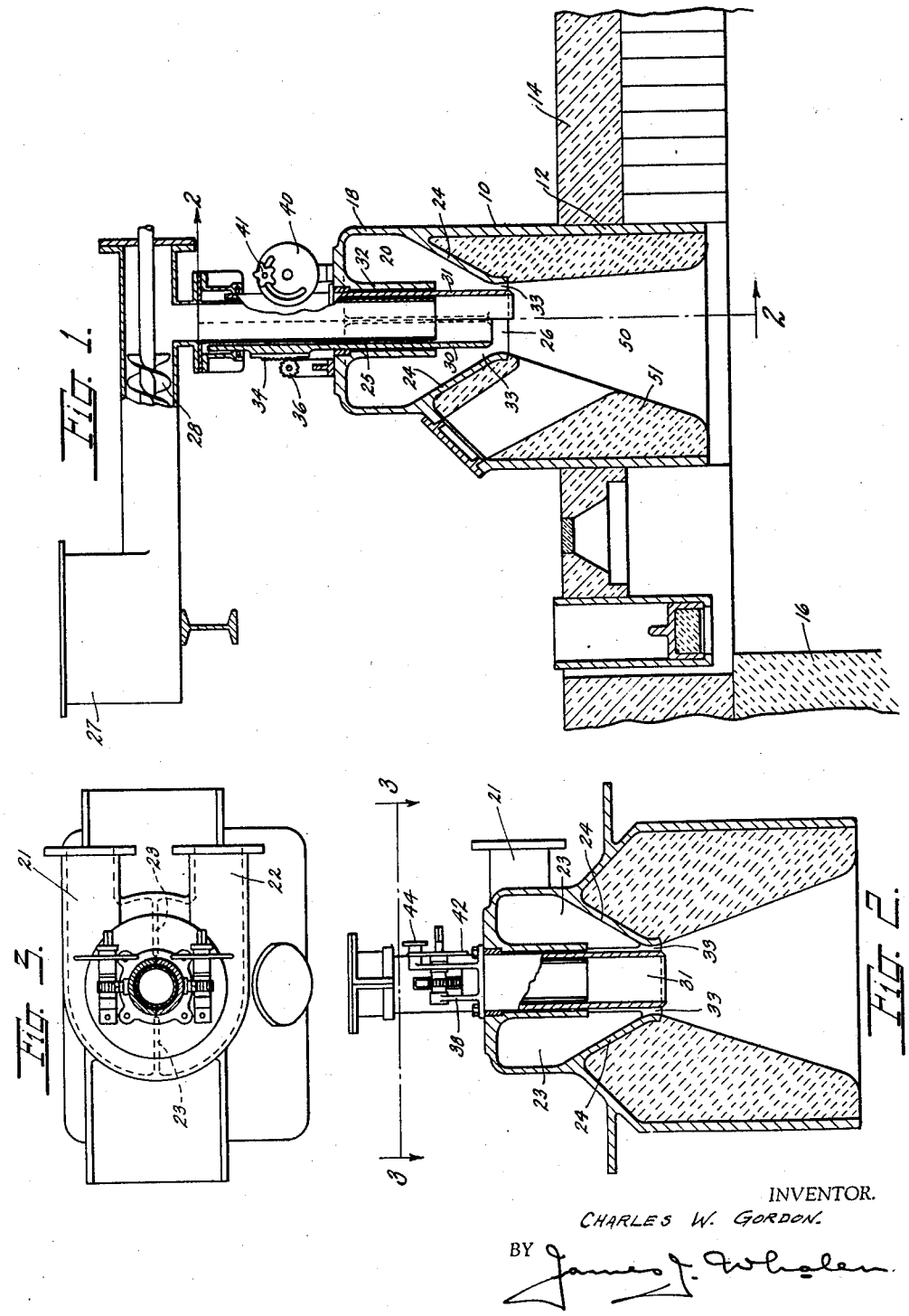
INVENTOR.
CHARLES W. GORDON.
BY James J. Whalen Patented Oct. 31, 1944

2,361,681

UNITED STATES PATENT OFFICE 2,361,681

PULVERIZED FUEL BURNER

Charles W. Gordon, Glen Ellyn, Ill., assignor to Combustion Engineering Company, Inc., New York, N. Y.

Application July 12, 1941, Serial No. 402,098

2 Claims. (Cl. 110—104)

This invention relates to improvements in fuel burners and particularly to those for burning dried pulverized materials such as sewage sludge.

In burning sewage sludge and like materials it is necessary in order to maintain ignition to deliver the fuel and air mixture into a furnace adjacent a hot refractory wall. It is also desirable to be able to vary the angularity of the fuel stream with respect to said wall, so as to cause it to flow parallel thereto or to impinge upon the wall at any desired distance from the burner. For example, when burning high volatile sludges a minimum of impingement upon the wall is sufficient to maintain ignition while when burning low volatile sludges the area of impingement upon the wall must be increased. In some sludge drying systems part of the dry sludge from a separator is delivered at intervals to the burners so that if the material is delivered directly thereto its flow would be intermittent and cause an interrupted flame in the furnace. Such a system is disclosed in United States patent to Smith, 2,157,775 granted May 9, 1939. To obviate such an interruption of the flame in the furnace, I have interposed a screw feed type of feeder between the intermittent delivery associated with the separator and the burner which effects an equalization or smoothing out of the sludge fed to the burner. The improved burner is also arranged in such manner as to maintain a positive flow of sludge from the feeder through the burner and into the furnace in order to avoid any blow back into the feeder.

The invention may be best understood from the accompanying drawing, in which:

Figure 1 is a sectional elevation through the center line of the burner and feeder and shows the location of the burner with respect to the adjacent furnace wall;

Figure 2 is a section taken on line 2—2 in Figure 1; and

Figure 3 is a section on line 3—3 of Figure 2.

The burner housing 10 has an apron 12 projecting through the wall 14 of the furnace in a position close to the adjoining wall 16; in Figure 1 these walls are the top and adjoining side wall of the furnace. The housing 10 has a cylindrical upper part 18 forming the upper portion of an air chamber 20 to which air under pressure is delivered by one or more blowers (not shown) through inlet pipes 21, 22 located at opposite sides of a diametrical wall in the air chamber formed by radial partitions 23. The lower part 24 of the inner wall of air chamber 20 is inclined and converges toward the axis of a fuel delivery tube 25 extending centrally into the air chamber to a relatively small air outlet 26. Dried sewage sludge in pulverized form is uniformly fed from a hopper 27 by a mixing screw 28 to the fuel delivery tube 25 which extends centrally into the air chamber 20 with its inner end positioned above the air outlet 26 of the chamber.

A cylindrical sleeve divided longitudinally, i. e. along its axis, into two semi-circular sections 30 and 31 is slidably mounted on the fuel delivery tube 25 within the air chamber 20 and constitutes a tubular extension of the tube 25. The sleeve sections are slidable in a guide bearing 32 through which the fuel tube 25 also extends. The sleeve 30, 31 is of somewhat smaller diameter than the outlet opening 26 of the air chamber 20, thus providing a narrow annular slot 33 through which air flows to meet the stream of fuel delivered through the tube 25, and discharging from the end of its sleeve sections 30, 31. The radial partitions 23, previously mentioned, extend from the inner wall of air chamber 20 to the fuel delivery tube 25 and sleeve 30, 31, the inner edges of the partitions extending along the lines of division between the sleeve sections 30, 31. Thus, as shown in Figure 3, the air chamber 20 is divided into compartments, each individual to one of the sleeve sections. The lower end of the sleeve 30, 31 is normally positioned in, or closely adjacent to, the outlet opening 26 but each section is retractable. Each sleeve section protrudes from housing 10 and is provided with a toothed rack 34 engaged by a pinion 36 secured to a shaft journalled in a bracket 38 on the burner housing 10. A hand wheel 40 is provided for rotating the pinion 36 to raise or lower the related sleeve section 30 or 31 and the adjusted position may be maintained as by means of a locking knob 41 threaded on a stud carried by the bracket 38 and extending through a slot in the hand wheel 40.

Fuel delivered to and falling through the fuel delivery tube 25 meets a generally annular current of air discharging through the slots 33 adjacent the lower ends of the adjustable sleeve sections 30, 31 and thence the mixture flows into the furnace through the expanding burner opening 50 located at the lower part of the apron 12 and lined with refractory 51. Should operating conditions make it desirable to have the flame pass closer to or impinge on the furnace wall 16 the sleeve 31 would be raised. Raising the sleeve section 31 increases the distance between its lower end and the adjacent portion of the converging wall 24 of the air chamber, thereby admitting more air through the right hand half, Figure 1, of the slot 33. The fact that the wall portion 24 of chamber 20 converges towards the outlet 26 of the air chamber causes it to act as a deflector so that the air is directed into the fuel stream at an increasingly sharper angle as sleeve section 31 is raised. Should it be desirable to have the flame path at a greater distance from the furnace wall 16 the sleeve 31 is lowered and the sleeve section 30 maintained in its upper position. The increased flow of air in the direction given thereto by the converging wall portion 24 then crowds or deflects the flame away from the wall 16. When either sleeve section 30 or 31 is raised the effect is not only to increase the air flow on that side of the burner but also to deflect the axis of the path of discharged fuel in a direction toward the sleeve or, in other words, towards the wall 16 in one case and away from it in the other.

As an additional means for controlling the path of the flame in the furnace, air may be supplied at different pressures through the inlets 21 and 22.

The direction and velocity of air admission through the slot 33 and the shape of the throat and discharge passage of the burner produce an eductor action maintaining a negative pressure in the fuel delivery tube 25 near the bottom of sleeve sections 30, 31, thereby eliminating any tendency for flame to blow back into the fuel line.

As mentioned previously, fuel is delivered to the hopper 27 at intervals but because the fuel is propelled to the fuel delivery tube 25 by the screw 28 the intermittency of the supply is equalized or smoothed out by the screw so that a substantially continuous supply of fuel at a uniform rate is maintained to the burner.

What I claim is:

1. In a fuel burner, means defining an air chamber including inclined inner wall surfaces forming a passage converging toward the axis of the chamber and having a relatively small outlet; a fuel injecting tube extending centrally of said chamber along its axis to a point adjacent but short of said outlet; a longitudinally divided tubular sleeve slidably mounted on the outlet end of said tube and constituting an extension thereof with its inner end disposed closely adjacent to said outlet, said sleeve being of smaller cross sectional area than said outlet so as to leave an air delivery slot around said sleeve; partitions extending from the inner wall of said chamber to said tube and sleeve having their inner edges along the lines of division of said sleeve for subdividing said chamber into compartments each individual to a section of said sleeve; means selectively operable for moving either sleeve section outwardly on said tube to increase the distance between its end and the adjacent part of the inner converging wall of said chamber and thereby increase the width of the part of said slot at the end of said sleeve section; and means for delivering fuel to said tube and air under pressure to each compartment of said chamber.

2. In a fuel burner, means defining an air chamber including inclined inner wall surfaces forming a passage converging toward the axis of the chamber and having a relatively small outlet; a fuel injecting tube extending centrally of said chamber along its axis to a point adjacent but short of said outlet; a longitudinally divided tubular sleeve slidably mounted on the outlet end of said tube and constituting an extension thereof with its inner end disposed closely adjacent to said outlet, said sleeve being of smaller cross sectional area than said outlet so as to leave an air delivery slot around said sleeve; means selectively operable for moving either sleeve section outwardly on said tube to increase the distance between its end and the adjacent part of the inner converging wall of said chamber and thereby increase the width of the part of said slot at the end of said sleeve section; and means for delivering fuel to said tube and air under pressure to said air chamber.

CHARLES W. GORDON.